United States Patent
He et al.

(10) Patent No.: US 11,126,473 B2
(45) Date of Patent: Sep. 21, 2021

(54) ASSIGNING JOBS TO HETEROGENEOUS PROCESSING MODULES

(71) Applicant: Microsoft Technology Licensing, LLC, Redmond, WA (US)

(72) Inventors: Yuxiong He, Bellevue, WA (US); Sameh Elnikety, Redmond, WA (US); Kathryn S. Mckinley, Bellevue, WA (US); Shaolei Ren, Doral, FL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 16/355,217

(22) Filed: Mar. 15, 2019

(65) Prior Publication Data
US 2019/0213053 A1 Jul. 11, 2019

Related U.S. Application Data

(63) Continuation of application No. 15/092,397, filed on Apr. 6, 2016, now Pat. No. 10,303,524, which is a continuation of application No. 13/724,826, filed on Dec. 21, 2012, now Pat. No. 9,336,057.

(51) Int. Cl.
*G06F 9/50* (2006.01)
*G06F 9/48* (2006.01)

(52) U.S. Cl.
CPC .......... *G06F 9/5094* (2013.01); *G06F 9/4881* (2013.01); *G06F 9/5027* (2013.01); *G06F 2209/5018* (2013.01)

(58) Field of Classification Search
CPC .... G06F 9/5094; G06F 9/4881; G06F 9/5027; G06F 2209/5018
See application file for complete search history.

(56) References Cited

U.S. PATENT DOCUMENTS

| | | | |
|---|---|---|---|
| 2002/0129127 A1* | 9/2002 | Romero | G06F 9/505 709/220 |
| 2005/0034130 A1* | 2/2005 | Skovira | G06F 9/5072 718/105 |
| 2010/0153956 A1* | 6/2010 | Capps, Jr. | G06F 9/5044 718/102 |

(Continued)

OTHER PUBLICATIONS

Greenhalgh; "Big.LITTLE Processing with ARM Cortex-A15 & Cortex-A7"; ARM Limited Whitepaper; Sep. 2011, 8 pages (Year: 2011).*

*Primary Examiner* — Eric C Wai
(74) *Attorney, Agent, or Firm* — Buckley, Maschoff & Talwalkar LLC

(57) ABSTRACT

A processing system is described which assigns jobs to heterogeneous processing modules. The processing system assigns jobs to the processing modules in a manner that attempts to accommodate the service demands of the jobs, but without advance knowledge of the service demands. In one case, the processing system implements the processing modules as computing units that have different physical characteristics. Alternatively, or in addition, the processing system may implement the processing modules as threads that are executed by computing units. Each thread which runs on a computing unit offers a level of performance that depends on a number of other threads that are simultaneously being executed by the same computing unit.

13 Claims, 11 Drawing Sheets

(56) References Cited

U.S. PATENT DOCUMENTS

2012/0266175 A1\* 10/2012 Zheng .................. G06F 9/5088
718/103
2013/0111484 A1\* 5/2013 Chen .................. G06F 11/0757
718/102

\* cited by examiner

ASSIGNING JOBS TO HETEROGENEOUS PROCESSING MODULES

BACKGROUND

A developer of an online service may design a data center with the objective of meeting certain performance goals, such as average quality of response, throughput, and energy efficiency. To this end, the developer will attempt to select an appropriate type of server for use in the data center, and a desired number of these servers. But this selection task presents complex challenges. Other environments (besides online services implemented by data centers) face similar challenges.

SUMMARY

A scheduling module is described herein which assigns jobs to heterogeneous processing modules provided by a processing system. The scheduling module performs this task based on the service demands associated with the jobs, e.g., by attempting to allocate resource-intensive jobs to high-performing processing modules, and less resource-intensive jobs to lower-performing processing modules. But, in one implementation, the scheduling module performs this task without necessarily having advance knowledge of the resource demands associated with the jobs.

According to one illustrative aspect, the scheduling module enables the processing system to achieve one or more of: a specified throughput objective; a specified quality objective; and a specified energy utilization objective. In one case, a quality measure can reflect a level of completeness of responses provided by the processing modules.

According to another illustrative aspect, the scheduling module includes logic configured to assign a new job to a processing module having a highest performance level that is currently available. In another implementation, the scheduling module first assigns the new job to a lower-performing processing module; if the job cannot finish by a prescribed time period on the lower-performing processing module, the scheduling module can transfer it to a higher-performing processing module.

According to another illustrative aspect, the scheduling module is further configured to determine that a previously-assigned job has ended on a newly-vacated processing module having a vacated-module performance level. The schedule module then reassigns a most-urgent in-progress job to the newly-vacated processing module, providing that the in-progress job is executing on a processing module having a lower performance level compared to the vacated-module performance level.

In one implementation, the heterogeneous processing modules correspond to computing units (e.g., processing cores) having different physical characteristics and/or different operating conditions.

In another implementation, the heterogeneous processing modules correspond to threads that run on computing units. Each thread which runs on a computing unit offers a level of performance that depends on a number of other threads that are simultaneously being executed by the same computing unit. That is, a thread that runs on a computing unit that is simultaneously executing M threads has a higher performance level than a thread that runs on a computing unit that is simultaneously executing N threads, providing that M<N.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of an illustrative processing system that assigns jobs to heterogeneous processing modules. Section B describes various implementations of the processing system of Section A, such as an implementation in which the processing modules correspond to threads that execute on computing units. Section C describes illustrative computing functionality that can be used to implement any aspect of the features described in Sections A and B.

Figure 10:
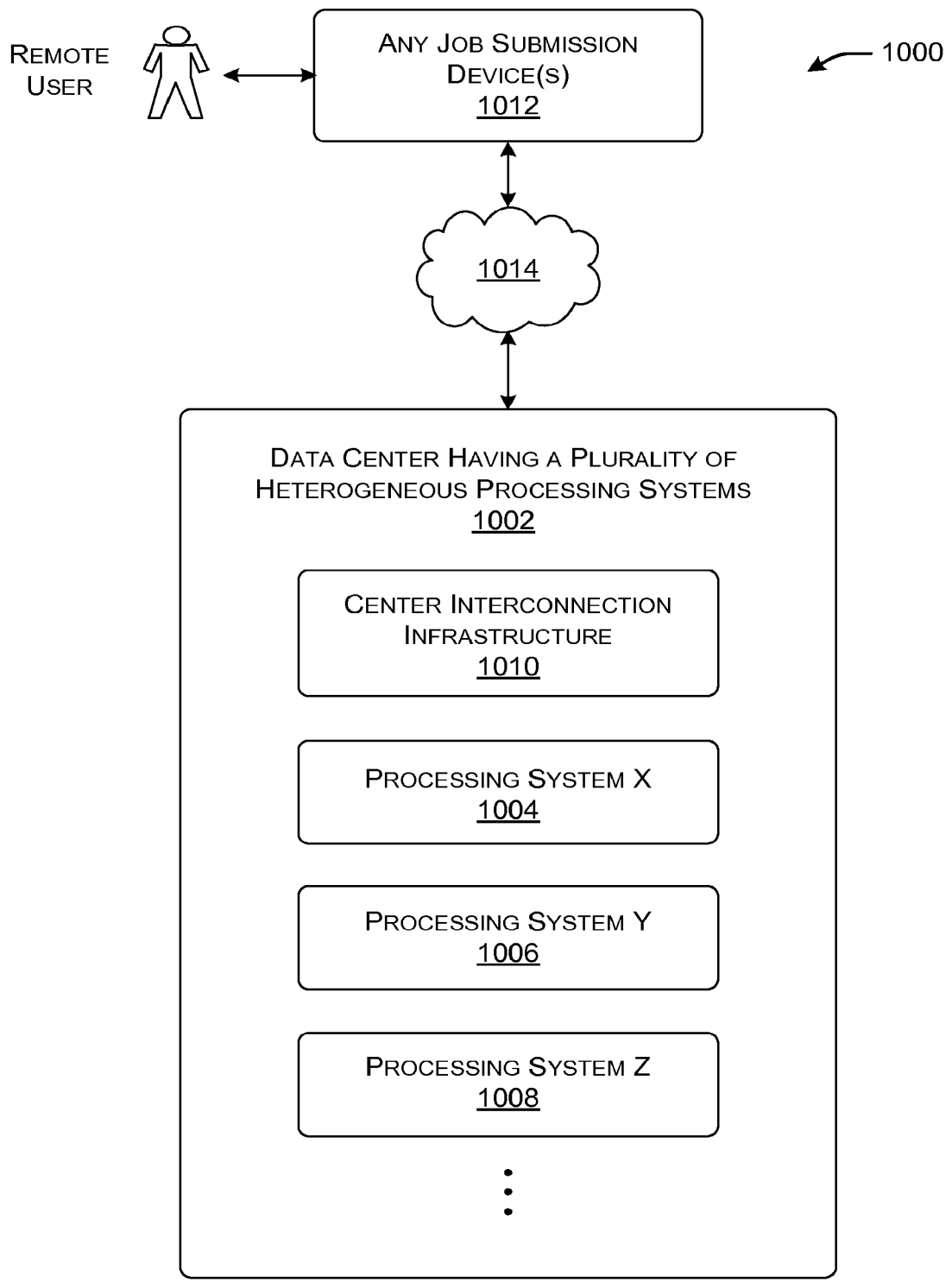
FIG. 10 shows an illustrative environment in which the type of processing system of FIG. 1 can be employed.
Figure 11:
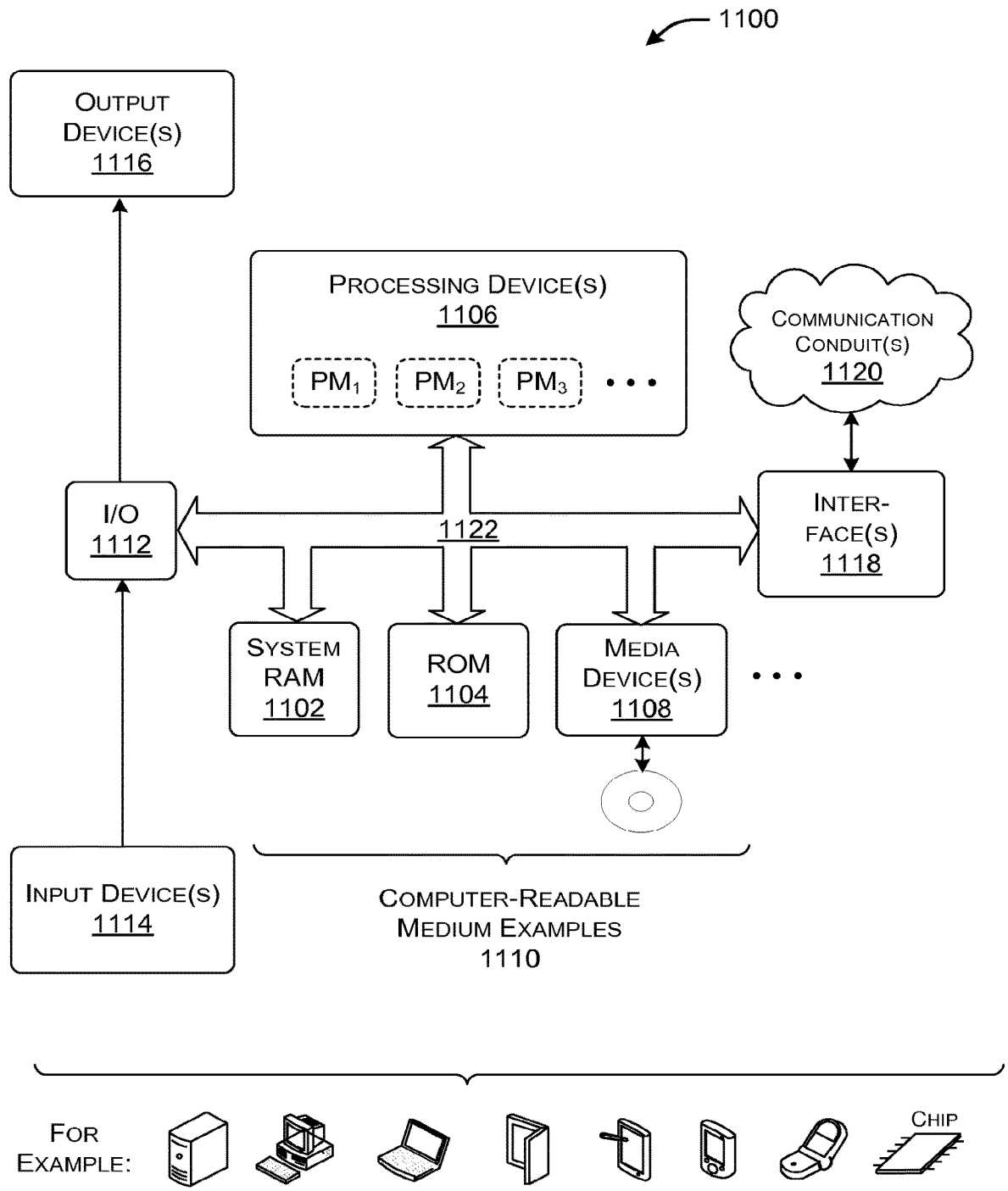
FIG. 11 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIGS. 10 and 11, to be described in turn, provide additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/ or any combination thereof. When implemented by a computing system, a logic component represents an electrical component that is a physical part of the computing system, however implemented.

The phrase "means for" in the claims, if used, is intended to invoke the provisions of 35 U.S.C. § 112, sixth paragraph. No other language, other than this specific phrase, is intended to invoke the provisions of that portion of the statute.

Figure 1:
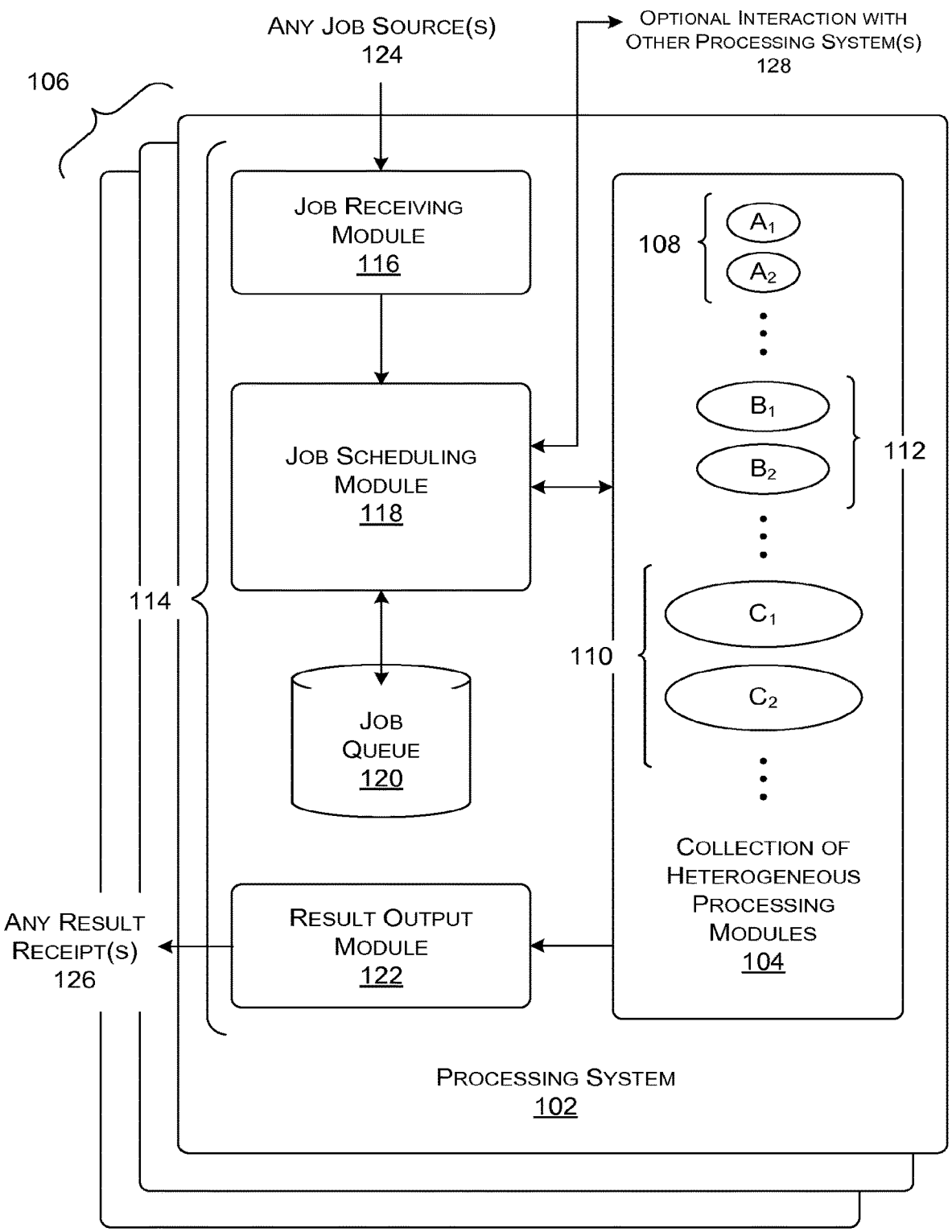
FIG. 1 shows at least one illustrative processing system having heterogeneous processing modules. The processing system also includes a scheduling module that is configured to assign jobs to the processing modules.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview of an Illustrative Processing System FIG. 1 shows an illustrative processing system 102 having heterogeneous processing modules 104. The processing system 102 can be used in any environment. For example, a data center may use a group of processing systems 106 to provide any type of service or combination of services to end users. In that scenario, the processing system 102, which is one of the group of processing systems 106, may correspond to a server. In another case, the processing system 102 may represent functionality provided by any type of local computer device.

Each processing module in the collection of processing modules 104 includes logic for performing processing operations. Section B describes different physical implementations of the processing modules 104. As explained there, the processing system 102 can implement the processing modules 104 as processing cores of one or more CPUs. Alternatively, the processing system 102 can implement the processing modules 104 as threads which run on the processing cores. Still other implementations are possible.

The processing modules 104 are heterogeneous because they offer different levels of performance. For example, at least two of the processing modules 104 may operate at different speeds. A processing module that runs at a relatively fast rate can execute more operations compared to a processing module that runs at a slower rate. However, a processing module that runs at the faster rate may also consume more energy than its lower-performing counterpart.

FIG. 1 shows a high-level example in which the processing modules 104 employ three different types of processing modules having three respective performance levels. The collection of processing modules 104 can include zero, one, or more members from each of these groups of processing modules. Other implementations can offer just two types of processing modules, or more than three types of processing modules.

In the example of FIG. 1, the processing modules 104 include a first group 108 of processing modules, each of which offers the lowest level of performance. In other words, each of the processing modules in this group 108 may run the slowest, but may consume the least amount of energy during its operation. In a third group 110, each processing module offers the highest level of performance. In other words, each of the processing modules in this group 110 may run the fastest, but may consume the most amount of energy. A processing module in a second group 112 exhibits a level of performance and energy expenditure midway between a processing module of the first group 108 and a processing module of the third group 110. From a metaphorical standpoint, the first group 108, second group 112, and third group 110 may provide, respectively, "small," "medium," and "large," processing modules.

The processing system 102 may also include job scheduling functionality 114 that assign jobs to individual respective processing modules in the collection of processing modules 104. The job scheduling functionality 114 can be implemented as a hardware logic component, a software component, or some combination thereof. For example, the processing system 102 can implement the scheduling functionality 114 as an application-level or operating system level program module, or some other type of program module. In another implementation, a component which is external to the processing system 102 can implement the job scheduling functionality 114, in whole or in part. In one implementation, the job scheduling functionality 114 can be subject to interrupts generated by any logic component associated with the processing system 102, such as an operating system.

In one implementation, the job scheduling functionality 114 can include a job receiving module 116, a scheduling module 118, a job queue 120, and a result output module 122. In operation, the job receiving module 116 receives jobs from any job source(s) 124. For example, the job receiving module 116 may represent interface functionality provided by a data center which implements one or more online services. In this environment, the job source(s) may correspond to end users. The users operate user devices to submit job requests to the job receiving module 116. Next, the scheduling module 118 assigns the jobs to the processing modules 104 based on the rules described below. The processing modules 104 then perform their work on the jobs to provide output results. The result output module 122 forwards the output results to one or more recipients 126. For example, the recipients 126 may correspond to the users who submitted the requests.

To be more concrete, consider a first non-limiting scenario in which the processing system 102 is part of the functionality used by an online search engine. In that environment, the job receiving module 116 can receive a query from a user. That query represents a job request associated with a new job. The search engine can then use a plurality of search modules to process the query. More specifically, each search module operates by comparing the query against a portion of an inverted index to identify documents (if any) which match the query. An aggregator module compiles partial results received from the search modules to form a final result. The result output module 122 then sends final result to the user, e.g., as a list of documents that match the query.

In this context, the processing system 102 may represent one server among many servers employed by the search engine. The processing modules 104 on the processing system 102 correspond to a subset of the search modules employed by the search engine. In this case, the scheduling module 118 assigns queries to the search modules.

Consider a second non-limiting scenario in which the processing system 102 is part of the functionality used by an online financial analysis service. In that environment, the job receiving module 116 can receive a request from a user to perform a financial calculation. The financial modeling engine can use a plurality of analysis modules to perform the calculation. More specifically, in one merely illustrative case, each analysis module performs a sampling operation, e.g., using Monte Carlo simulation or some other statistical estimation technique, to generate an output result. The result output module 122 returns the output result to the user.

In this context, the processing system 102 may again represent one server among many servers employed by the financial analysis service. The processing modules 104 on the processing system 102 correspond to a subset of the analysis modules used by the financial analysis service. In this case, the scheduling module 118 assigns requests to the analysis modules.

The scenarios described above are cited by way of illustration, not limitation. Still other applications are possible.

In many cases, a job may be said to have a starting time, a deadline, and a service demand. The starting time refers to the time at which the scheduling module 118 receives the job. The deadline may correspond to the time at which the user demands a response to the job. In some cases, the deadline is explicit, and is communicated in the job request. In other cases, the deadline is implicit. For example, a search engine may endeavor to deliver a response within a specified time, e.g., a fraction of a second in one case, or one or more seconds in another case. But that deadline is not explicitly expressed in each query. The service demand refers to the amount of processing resources that will be required to perform the job in the specified period of time.

In some cases, a job request will explicitly convey the service demand associated with a job, or the processing system 102 can otherwise determine the service demand associated with the job. For example, in the search context, it may be possible, in some circumstances, to estimate the processing demand of a particular query if that same query has been processed on one or more prior occasions, and/or based on other factors. Further, the processing system 102 can generate statistics, based on historical information, pertaining to the expected distribution of processing loads associated with queries. In the search context, for instance, the processing system 102 can determine that most jobs are typically "short" in duration.

In other cases, however, the amount of resources that will be required to perform the job will be unknown or at least uncertain. In this scenario, the processing system 102 only discovers the requirements of the job in the course of processing the job. In general, this means that the scheduling module 118 is tasked with the responsibility of allocating jobs to processing modules 104 without sometimes knowing the demands which each job will impose during its execution. If the processing demand is known or capable of being estimated, this information can contribute to the level of urgency that is assigned to the job; but, as a default principle, the demand is considered to be unknown.

In some cases, the processing modules 104 can deliver a response that has high quality. Consider the search context. Each processing module may have sufficient time to match a query against its entire inverted index portion. As a whole, the processing modules 104 can therefore return a result which identifies all the documents which can possibly match the query. In other cases, the processing modules 104 may deliver a response that has less-than-optimal quality. For example, a processing module may have time to match the query against only a part of its inverted index, not the entire index. As a result, the processing modules 104, as a whole, may return a result which is not a complete reflection of the all the documents which can possibly match the query. The result in this case may be satisfactory because the processing modules can be configured to identify documents in the order of most relevant to least relevant. Thus, even if the search is truncated before fully completing, the less-than-optimal results may identify the most relevant documents. But the results are nonetheless not optimal. In another example, a financial analysis service may use processing modules that perform any type of iterative calculations to arrive at a result. The accuracy of that result increases with the amount of time that the processing modules are given to perform their calculations.

FIGS. 2-7 provide details regarding the logic that the scheduling module 118 can use to schedule jobs. In general, the scheduling module 118 can be said to assign jobs to the processing modules 104 based on the service demands associated with those jobs. More specifically, the scheduling module 118 may attempt to assign resource-intensive jobs to high-performing processing modules, while less resource-intensive jobs to lower-performing jobs. But as noted above, the scheduling module 118 may be forced to perform this allocation without advance knowledge of the service demands of the jobs.

Overall, the processing system 102 may attempt to achieve one or more performance objectives, given one or more specified constraints. In one case, the scheduling module 118 attempts to provide the highest quality results possible (e.g., on average), subject to one or more constraints (e.g., an energy utilization budget, etc.). Different environments can assess quality in different ways. In the search context described above, the quality of a response reflects the time-dependent completeness of the response. In the financial analysis context, the quality of a response reflects the time-dependent accuracy of the response. In other cases, the scheduling module 118 can primarily attempt to increase throughput, subject to one or more constraints. Throughput refers to an amount of jobs that can be processed by the processing system 102 in a prescribed amount of time. In other cases, the job scheduling functionality 114 can primarily attempt to lower energy utilization, subject to one or more other constraints. Energy efficiency refers to the amount of energy consumed by the processing system 102 in performing its operations. In other cases, the scheduling functionality 114 can primarily attempt to reduce the number of processing modules that are used by a data center, subject to various constraints, and so on. These performance goals are not mutually exclusive. That is, in many cases, a designer will have achieved two or more of the performance goals in a principal attempt to achieve one of the goals.

Figure 2:
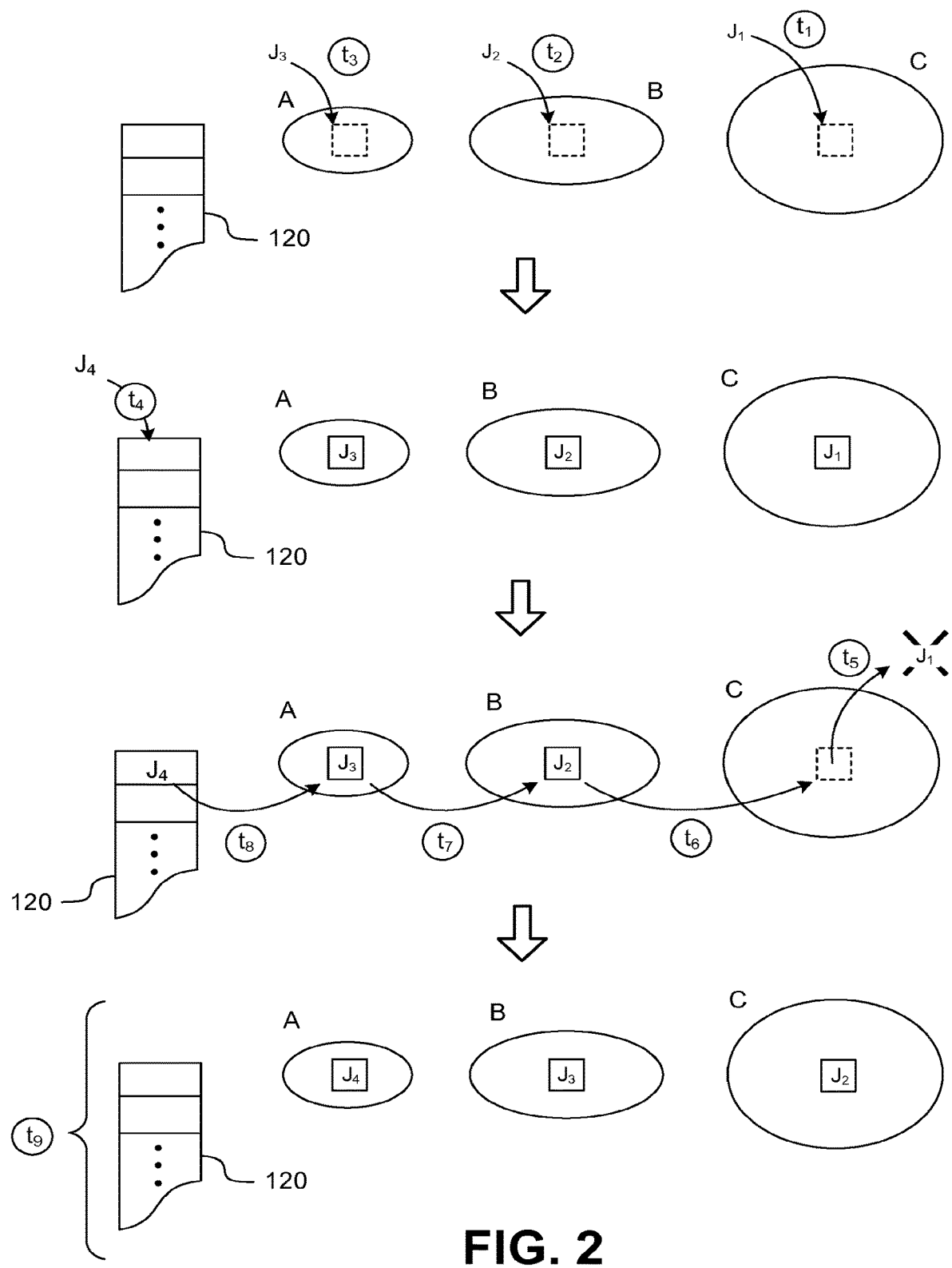
FIG. 2 illustrates a scenario in which the scheduling module of FIG. 1 assigns jobs to three different processing modules having different respective performance levels (e.g., "sizes").

Starting with FIG. 2, this figure illustrates a scenario in which the scheduling module 118 assigns jobs to three different processing modules having respective performance levels. The processing module A has the lowest performance level, the processing module C has the highest performance level, and the processing module B has a performance level that is between the levels of modules A and B. The performance levels may correspond to the speeds at which the processing modules can perform their operations. That is, the processing module A is the slowest, but consumes the least energy, while the processing module C is the fastest, but consumes the most energy. The processing modules A, B, and C can be informally referred to as small, medium, and large modules, respectively.

FIG. 2 annotates operations with time information ($t_1$, $t_2$, etc.) that conveys an illustrative ordering of the operations. At time $t_1$, the scheduling module 118 assigns a new job $J_1$ to the processing module with the highest-performing module that is currently available. The highest-performing module at this time is processing module C. At time $t_2$, the scheduling module 118 assigns a new job $J_2$ to the highest-performing module that is currently available. Since processing module C is now unavailable, the highest-performing module at this time is processing module B. At time $t_3$, the scheduling module 118 assigns a new job $J_3$ to the highest-performing module that is currently available. The only processing module that is available at this time is processing module A, so the scheduling module assigns job $J_3$ to processing module A.

At time $t_4$, assume that the scheduling module 118 receives a fourth job $J_4$. All of the processing modules (A, B, and C) are currently processing jobs, so none of them are available to accept a new job. In view of this, the scheduling module 118 adds the new job $J_4$ to the job queue 120.

At time $t_5$, assume that the job $J_1$ that is running on the processing module C ends, e.g., either because its work is done, or because its allotted processing time has expired, or because it has been suspended, or because it terminates for any other reason. At time $t_6$, the scheduling module 118 responds to this event by transferring the most-urgent in-progress job from a "smaller" processing module to the processing module C. In one case, the urgency of a job corresponds, in part, to its age, measured from the time it was received by the scheduling module 118. Thus, the scheduling module 118 will transfer the job $J_2$ to the processing module C, since the job $J_2$ is the oldest in-progress job.

The migration of job $J_2$ to the processing module C leaves the processing module B idle. In view thereof, at time $t_7$, the scheduling module 118 applies the same rule described above, e.g., by transferring the most-urgent in-progress job from a smaller processing module to the processing module B. This rule prompts the scheduling module 118 to move the job $J_3$ to the processing module B.

The migration of job $J_3$ to the processing module B leaves the processing module A idle. There are no more in-progress jobs on smaller processing modules to move to larger processing modules because processing module A is the smallest processing module. But there is a job $J_4$ in the job queue 120. Therefore, at time $t_8$, the scheduling module 118 moves the job $J_4$ to the processing module A. FIG. 2 represents the final outcome of the operations described above at a time $t_9$.

In general, note that the scheduling module 118 acts to move jobs from smaller processing modules to larger processing modules. In one implementation, the scheduling module 118 will not move jobs between processing modules of the same size. Nor will it move jobs from higher-performing processing modules to lower-performing processing modules. The movement of jobs from lower to higher-performing processing modules increases the likelihood that a resource-intensive job will complete by its deadline, or that this job can at least generate a higher quality result (if it cannot complete by its deadline). This is because the higher-performing processing module can devote more resources to the migrated job, compared to the lower-performing processing module. An "old" job is treated as a likely resource-intensive job because it has already consumed a significant amount of processing resources, and it is expected to consume even more resources. In other words, the scheduling module 118 estimates the service demand of a job by observing how much resources it consumes during its execution; if the job fails to complete quickly, the job is classified as a resource-intensive job.

Figure 3:
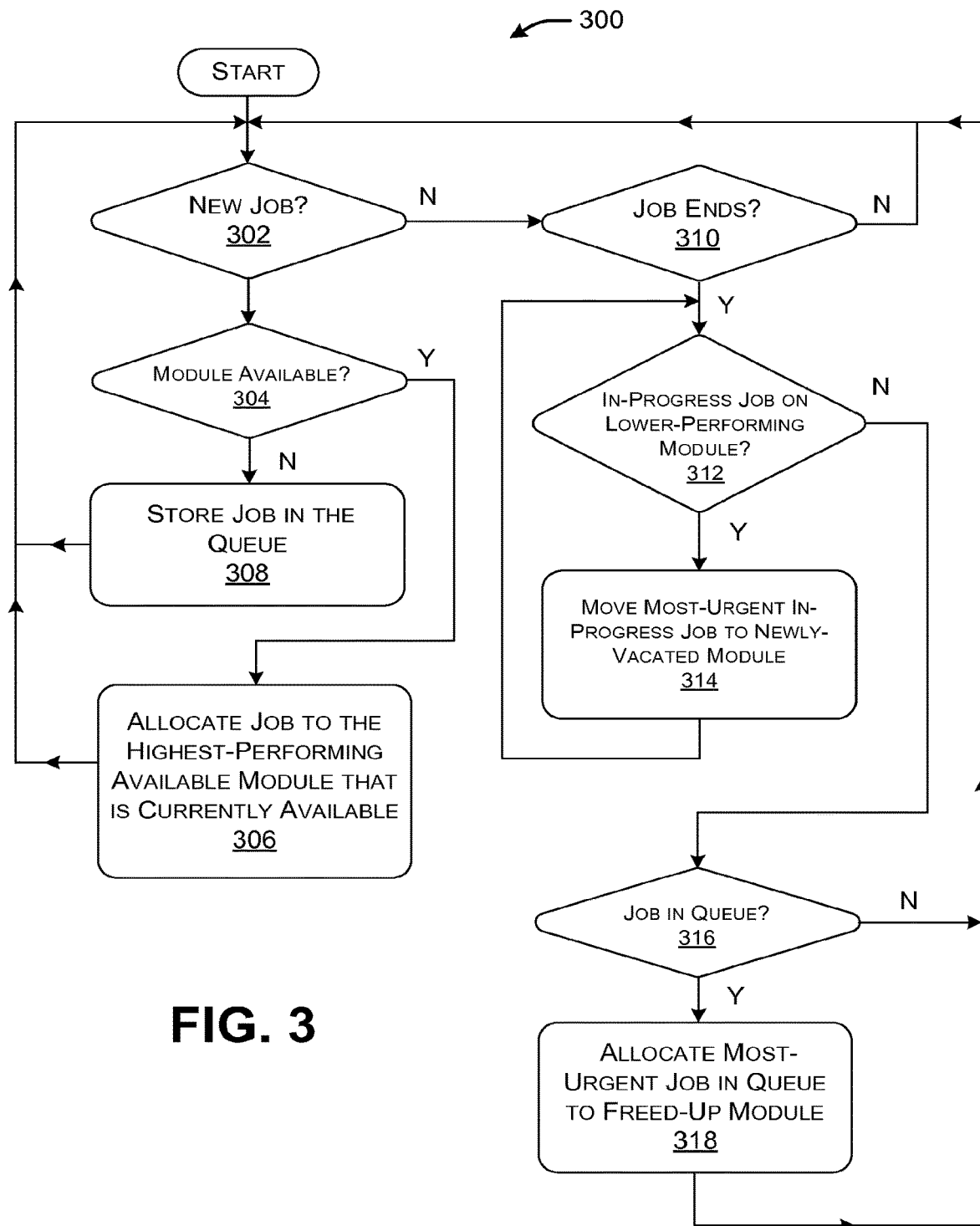
FIG. 3 is a flowchart which explains one manner of operation of the scheduling module of FIG. 1, corresponding to the example of FIG. 2

FIG. 3 is a procedure 300 which generalizes the operations of FIG. 2 in flowchart form. In block 302, the scheduling module 118 determines whether a new job has been received. In block 304, the scheduling module 118 determines whether a processing module is currently available. If so, in block 306, the scheduling module 118 assigns the new job to the highest-performing processing module that is currently available. If not, in block 308, the scheduling module 118 stores the new job in the job queue 120.

In block 310, the scheduling module 118 determines whether a job that is running on one of the processing modules has terminated for any reason described above. This termination leaves a newly-vacated processing module. In block 312, the scheduling module 118 determines whether there is an in-progress job on a lower-performing processing module (e.g., a smaller processing module). If so, in block 314, the scheduling module 118 moves the in-progress job to the newly-vacated module. FIG. 3 indicates that blocks 312 and 314 can be repeated one or more times until no in-progress job can be migrated to a higher-performing processing module. This operation eventually leaves a feed-up processing module.

In block 316, after the above-described migration of in-progress jobs, the scheduling module 118 determines whether there are any jobs in the job queue 120. If so, in block 318, the scheduling module 118 moves the most-urgent (e.g., the oldest) job from the job queue 120 into the freed-up processing module.

Figure 4:
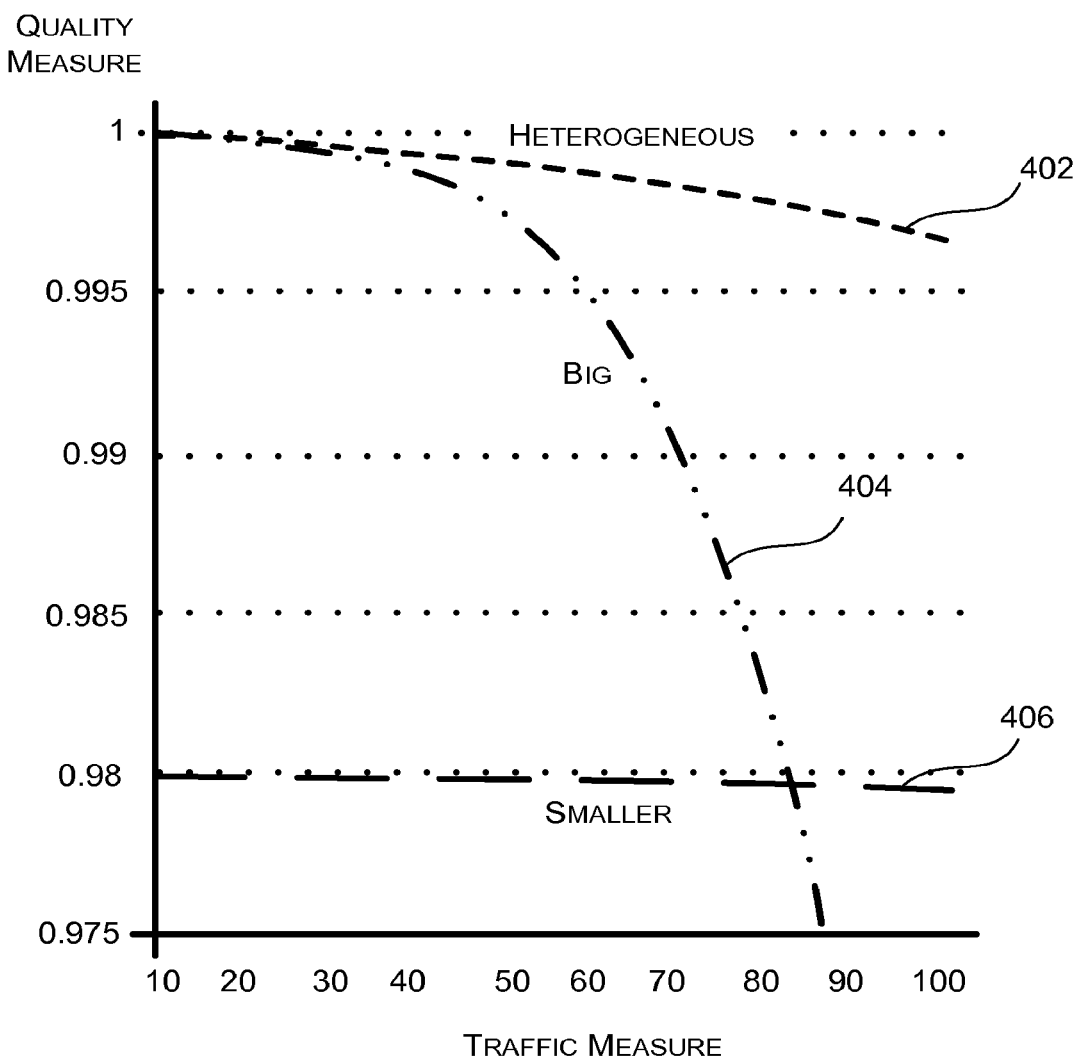
FIG. 4 is a graph that conveys one performance-related benefit offered by the processing system of FIG. 1.

FIG. 4 is a graph that conveys one performance-related benefit offered by the processing system 102 of FIG. 1, which implements the scheduling logic shown in FIGS. 2 and 3. In particular, the curve 402 shows the quality of results provided by the processing system 102 versus the quantity of traffic processed by the processing system 102. More specifically, the curve 402 indicates that the quality of the processing system 102 slightly degrades with an increase in traffic. Quality can be assessed in any manner described above. For example, quality may reflect the level of completeness of the responses.

FIG. 4 also provides two other curves (404, 406) which describe the performance of two baseline cases. In a first case, a high-performance homogeneous processing system is constructed using a homogeneous set of high-performance processing modules, e.g., only "big" processing modules. The curve 404 represents the performance of this type of system. The curve 404 indicates that the high-performance homogeneous processing system offers good quality for low traffic volumes, but the quality quickly degrades as load increases. In a second case, a low-performance homogeneous processing system is constructed using a homogeneous set of lower-performance processing modules, e.g., only "small" processing modules. The curve 406 represents the performance of this type of system. The curve 406 indicates that the lower-performance homogenous processing system offers performance that degrades only slightly with load, but that the quality is overall lower compared to the high-performance processing system at small loads.

In contrast, the curve 402 indicates that the heterogeneous processing system 102 avoids the steep drop-off in quality levels exhibited by curve 404. At the same time, the heterogeneous processing system 102 maintains considerably higher quality levels compared to the curve 406. In other words, the heterogeneous processing system 102 combines the merits of the high-performance and lower-performance homogeneous processing systems. The improvement in quality may also be accompanied by improvement in throughput and energy efficiency, relative to the high-performance homogeneous processing system and the lower-performance homogeneous processing system.

Figure 5:
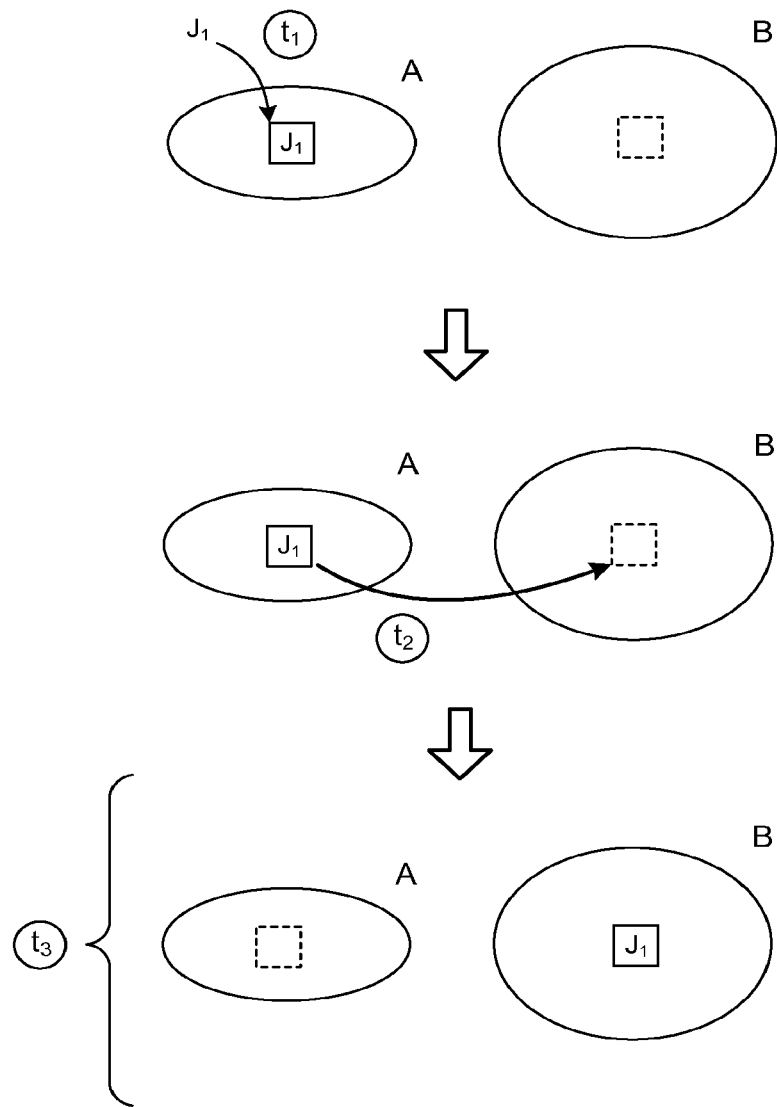
FIG. 5 illustrates a scenario in which the scheduling module uses an alternative rule (compared to FIG. 2) for assigning new jobs to heterogeneous processing modules.

FIG. 5 illustrates a scenario in which the scheduling module 118 uses an alternative rule (compared to FIGS. 2 and 3) for assigning new jobs to the processing modules 104. That is, in the case of FIG. 2, the scheduling module 118 assigns each new job to the processing module with the highest performance level that is currently available. In the case of FIG. 5, the scheduling module 118 assigns a new job to the processing module with the lowest performance level. But if that new job fails to finish on the low-performance processing module within a prescribed amount of time (and/or as per any other execution constraint), the scheduling module 118 will migrate it to a higher-performance processing module, such as the processing module with the highest performance level that is currently available.

More specifically, at time $t_1$, both the processing modules A and B are idle. The scheduling module 118 moves a new job $J_1$ to the processing module A because that module is smaller (lower-performing) compared to the processing module B. Time $t_2$ represents a predetermined interval following time $t_1$. At time $t_2$, the scheduling module 118 moves the job $J_1$ to the processing module B because it has failed to complete while on processing module B. Time $t_3$ reflects the outcome of the movement at time $t_2$.

The policy illustrated in FIG. 5 helps reduce the power consumption of the processing system 102. That is, the policy allows a job to complete on a low-performance (and low-powered) processing module if, in fact, the job is not a particularly resource-intensive job. This saves the power that would be otherwise "wasted" if a short job were immediately deployed to a higher-performing processing module. If the job proves to be resource-intensive, the scheduling module 118 can move it to a higher-performing processing module in the manner described above, incurring only a slight processing delay due to the transfer.

Figure 6:
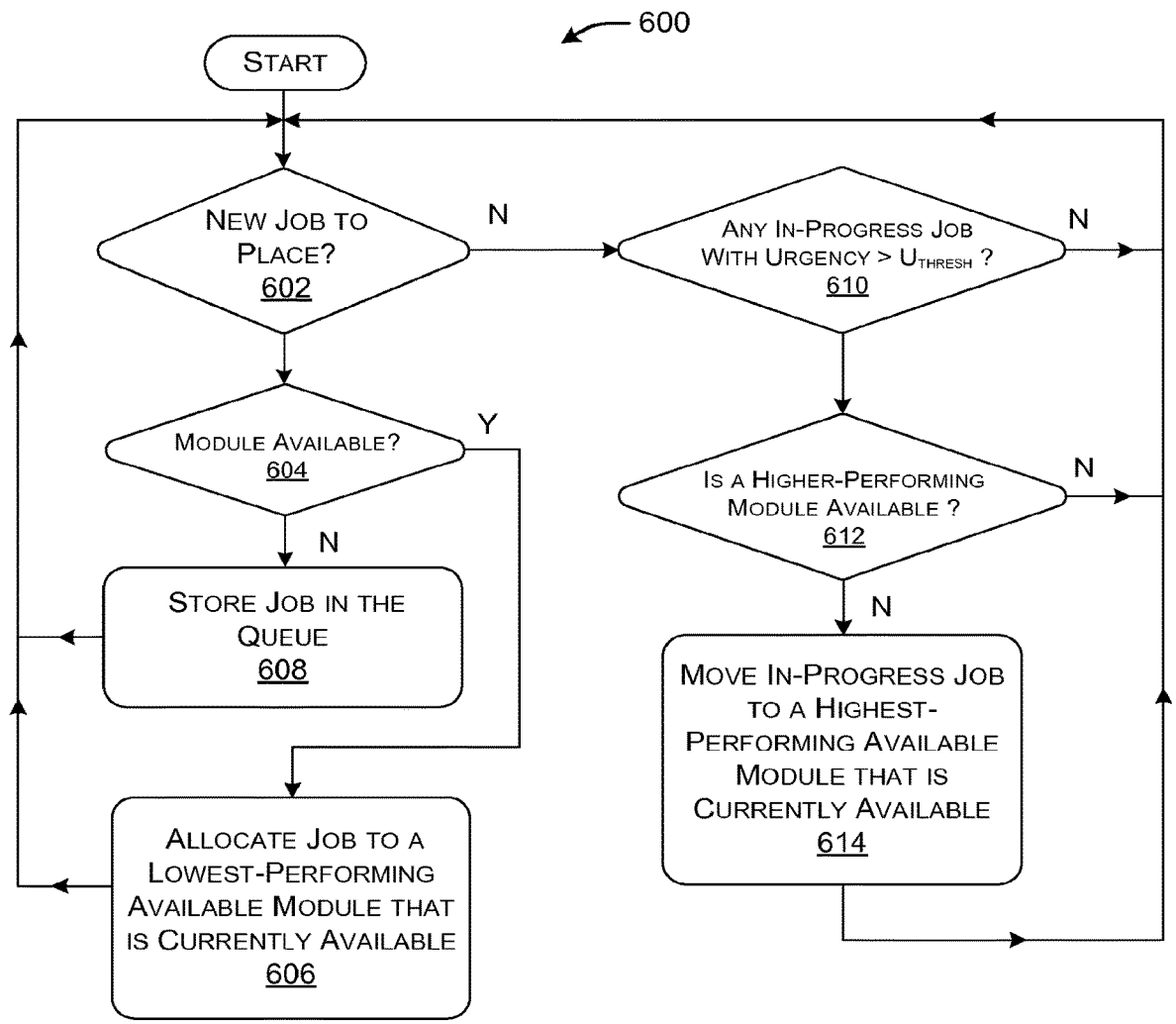
FIG. 6 is a flowchart which explains another manner of operation of the scheduling module of FIG. 1, corresponding to the example of FIG. 5.

FIG. 6 is a procedure 600 which explains the operations shown in FIG. 5 in flowchart form. In block 602, the scheduling module 118 determines whether a new job has been received. If so, in block 604, the scheduling module 118 determines whether there are any processing modules that are currently available on which to place the new job. If so, in block 606, the scheduling module 118 places the new job on the lowest-performing processing module that is currently available. If there are no processing modules available, then, in block 608, the scheduling module 118 places the new job in the job queue 120. In block 610, the scheduling module 118 determines whether there is an in-progress job on a lower-performing processing module that has a level of urgency which exceeds a prescribed urgency threshold ($U_{thresh}$). For example, the scheduling module 118 can perform this test by determining whether any in-progress job has been running on a lower-performing processing module for more than a prescribed amount of time without completing. If so, in block 612, the scheduling module 118 determines whether there is a higher-performing processing module that is available. And if so, in block 614, the scheduling module 118 moves the in-progress job to the highest-performing processing module that is currently available.

The logic shown in FIG. 6 can be used as a stand-alone processing protocol, or in conjunction with the logic shown in FIG. 3. For example, in the latter case, the scheduling module 118 can assign a new job to the smallest processing module that is currently available. If appropriate, the scheduling module 118 can then move the newly-placed job to a larger processing module if it fails to complete by a prescribed time. Simultaneously with the above-described process, the scheduling module 118 can handle the termination of in-progress jobs according to the logic described in blocks 310-318 of FIG. 3. This means that the scheduling module 118 can move in-progress jobs in two circumstances, e.g., based on a first rule described in blocks 610-614 of FIG. 6 and a second rule described in blocks 310-318 of FIG. 3.

In view of the alternative protocol of FIG. 6, a statement herein that indicates that a new job is moved to a highest-performing processing module is broad enough to encompass at least two scenarios. In a first case, the scheduling module 118 may immediately transfer the new job to the highest-performing processing module. But in a second case, the scheduling module 118 may transfer the new job to the highest-performing processing module after first deploying the job on a lowest-performing processing module.

Figure 7:
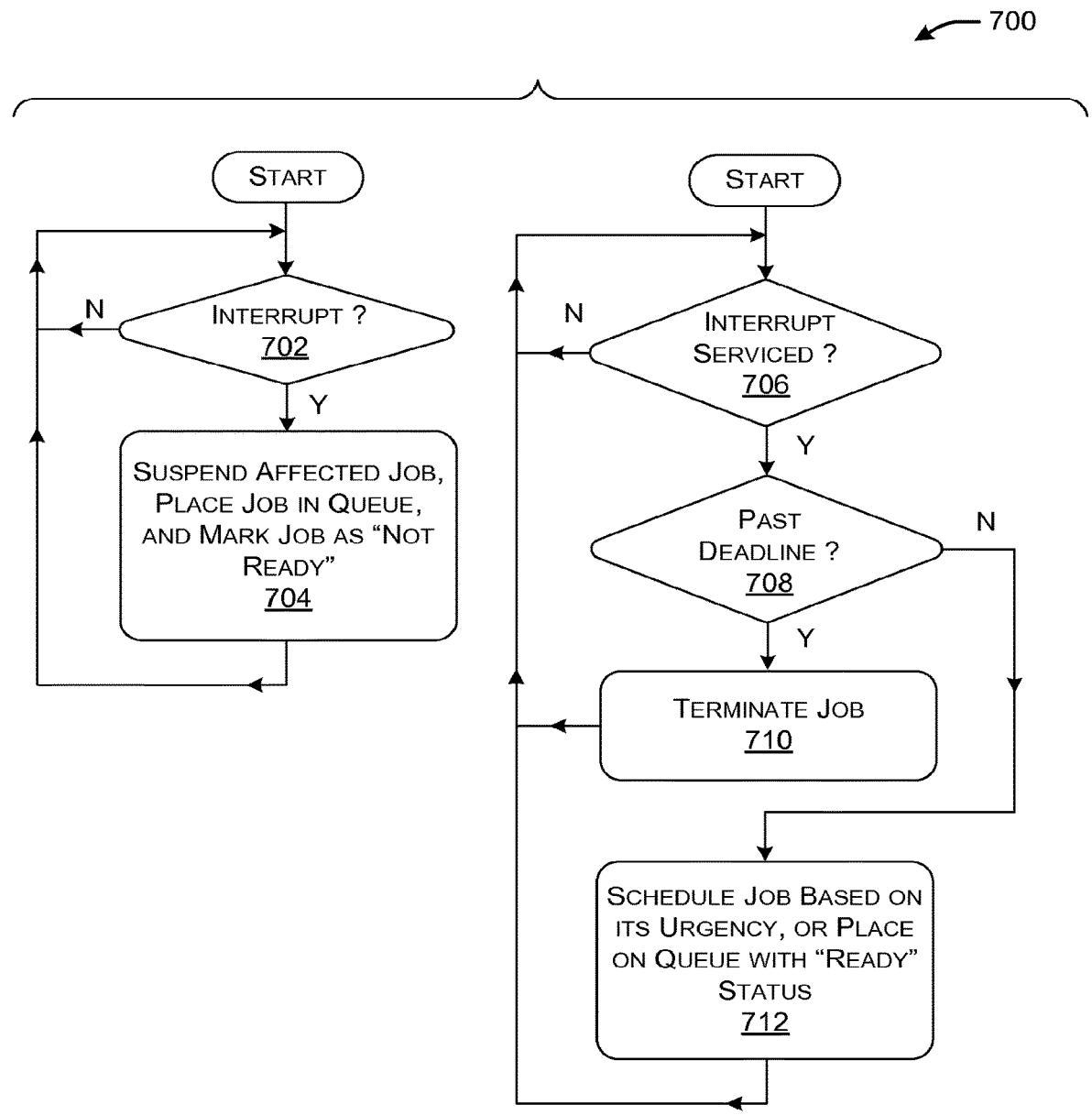
FIG. 7 is a flowchart which explains one manner of handling interrupts that affect the jobs.

FIG. 7 is a procedure 700 which explains one manner in which the scheduling module 118 may handle interrupts. The interrupts may originate from any source, such as an operating system, an application, etc., and they may be issued for any environment-specific reason. In one case, the interrupt is directed to a single identified job, and has the effect of suspending the execution of that job. In another case, the interrupt is directed to plural jobs, such as an identified class of jobs, etc. Here, the interrupt has the effect of suspending the execution of the plural affected jobs. Nevertheless, to simplify the explanation, it will henceforth be assumed that each interrupt is directed to a single job.

In block 702, the scheduling module 118 determines whether an interrupt has been received. If so, the scheduling module 118 determines whether the affected job is currently being executed by a processing module. If this is true, then, in block 704, the scheduling module 118 can stop the job, mark it to indicate that it is "not ready" for processing, and place the job in the job queue 120. Alternatively, the scheduling module 118 can place the marked job in another queue (not shown) that is dedicated to suspended jobs. Suppose, alternatively, that the interrupt pertains to a job that is already in the job queue 120. The scheduling module 118 can therefore mark this job to indicate that it is not ready for processing. Accordingly, at any given time, the job queue 120 can contain a mix of jobs, some of which are "ready" for scheduling, and others which are "not ready" for scheduling (that is, assuming that a single queue is used to handle all job requests). The scheduling module 118 will not schedule any job that is marked as "not ready."

In block 706, the scheduling module 118 determines whether a notification has been received that indicates that the interrupt has been serviced. This means that the processing of the affected job can resume. In block 708, the scheduling module 118 determines whether the deadline of the affected job has expired. If this is true, then, in block 710, the scheduling module 710 terminates the job. In another implementation, the scheduling module 118 can also terminate the job if the amount of time that is left to perform the job is below a prescribed threshold. The processing system 102 can optionally send the results of whatever processing it has performed on the terminated job, prior to the interrupt, to the recipient 126.

If the job has not expired, then, in block 712, the scheduling module 118 schedules the jobs on a processing module in accordance with its level of urgency. The level of urgency may reflect the time at which the job was originally received, and/or any other appropriate urgency-related factor(s).

The scheduling module 118 can use different approaches to carry out block 712. In a first approach, the scheduling module 118 can assign the resumed job to the highest-performing processing module that is currently available, with or without the preliminary processing described in FIG. 6. The scheduling module 118 can then rely on the migration logic described in FIG. 3 to potentially move the resumed job to a higher-performing processing module upon the termination of another job. Thus, if the resumed job is truly the most urgent job, it may migrate to a higher-performing processing module in due course as other jobs end.

In a second approach, the scheduling module 118 can rank the urgency levels of the jobs that are currently running on the processing modules, together with the urgency level of the resumed job. The scheduling module 118 can then migrate jobs to processing modules that are suited to the respective urgency levels of the jobs. This operation will effectively create a vacancy having an appropriate performance capacity to receive the resumed job. For example, assume that the resumed job is the most urgent of all jobs. The scheduling module 118 can migrate one or more existing jobs to leave a vacancy on the highest-performing processing module that is currently available. The scheduling module 118 can then assign the resumed job to that processing module. Incidentally, the scheduling module 118 can also perform this kind of proactive processing in any circumstance in which it receives a new job that is marked as having a higher level of urgency than one or more existing jobs that are being run on the processing modules (where urgency can be assessed based on any factor or combination of factors, not just based on the time that the job was received).

The above two approaches to scheduling assume that there is at least one available processing module to receive the resumed job. If there are no vacancies, the scheduling module 118 can assign the resumed job to the job queue 120.

Alternatively, the scheduling module 118 can optionally suspend a lowest-performing job, and then place that suspended job back on the job queue 120. The scheduling module 118 can then place the resumed job on a vacant processing module, with or without first migrating jobs on the processing modules to free up a processing module having an appropriate performance capacity.

Still other implementations are possible to handle interrupts. Further, the scheduling module 118 can also handle some interrupts by just suspending the affected jobs, and without removing these jobs from their respective processing modules. When the interrupts are serviced, the jobs resume on their respective processing modules.

As a final topic in this section, note that FIG. 1 indicates that the scheduling module 118 can also optionally interact with other processing systems, as per interaction 128. For example, the scheduling module 118 can also assign jobs to the processing modules (not shown) of one or more other processing systems. Further, the scheduling module 118 can accept jobs from one or more other processing systems.

Different rules can be used to govern an inter-system job assignment. In one case, the scheduling module 118 can determine whether its local processing system has insufficient capacity to satisfactorily process the jobs it has received (and/or the job it expects to receive) within desired performance goals. For example, the scheduling module 118 can reach this conclusion when its job queue 120 accumulates a prescribed number of jobs. In this circumstance, the scheduling module 118 can determine whether one or more other processing modules have spare capacity to accept new jobs. If spare capacity exists, the scheduling module 118 can then transfer a portion of yet-to-be assigned jobs and/or in-progress jobs to the processing modules of one or more other processing systems. The scheduling module 118 may likewise accept jobs forwarded by other processing systems (where each other processing system may perform the same decision process described above).

For the above reason, the collection of heterogeneous processing modules 104 shown in FIG. 1 can be considered as encompassing a first group of processing modules that are physically implemented by the processing system 102, together with a second group of processing modules that are implemented by one or more other processing systems, and therefore represent virtual members of the collection of processing modules 104.

In yet another implementation, a data center can employ a central scheduling module (not shown) which assigns jobs to the processing modules provided by all of the processing systems in the data center. In this context, the data center itself may be considered as one large processing system having an aggregate collection of heterogeneous processing modules; each individual processing system contributes processing modules to the master collection of processing modules. The central scheduling module can be used instead of the individual scheduling modules provided by individual processing systems, or it can supplement the functions of the individual scheduling modules. For example, the central scheduling module can transfer jobs from one processing system to another, but each individual scheduling module can otherwise perform the scheduling logic described in FIGS. 2-7.

B. Illustrative Implementations of the Processing Modules

Section A described the processing modules principally in the context of their performance. That is, that section described a large processing module as logic that performs computational tasks at a relatively high performance level, such as a high processing speed. Likewise, Section A described a small processing module as logic that performs computational tasks at a lower performance level. This section describes different ways that the processing system 102 may physically implement the collection of heterogeneous processing modules 104.

In one case, the processing modules 104 correspond to computing units of any type that have different physical characteristics. For example, the processing modules 104 may correspond to processing cores of a server that have different physical characteristics or are run under different physical conditions. For example, two computing units may physically differ because they incorporate different hardware components. Alternatively, or in addition, two computing units may physically differ because they incorporate different processing architectures. Alternatively, or in addition, two computing units may differ because they incorporate different software components. Alternatively, or in addition, two computing units may physically differ because they are run at different speeds, or power budgets, etc. Alternatively, or in addition, two computing units may differ because they have access to different sets of supporting resources, and so on. No limitation is placed on the manner in which two computing units can be designed and/or operated to offer different levels of performance.

In another case, a processing module may correspond to a thread that is implemented by a computing unit, such as a hardware thread which is implemented by a processing core that is capable of performing simultaneous multi-threading (SMT), also known as hyperthreading. In one case, for example, each computing unit can perform two-way SMT by incorporating two hardware threads. In another case, each computing unit can perform four-way SMT by incorporating four hardware threads, and so on. Or the collection of processing modules 104 can include computing units that support different numbers of hardware threads.

In this implementation, each thread which runs on a computing unit offers a level of performance that depends on a number of other threads that are simultaneously being executed by the same computing unit. That is, a thread that runs on a computing unit that is simultaneously executing M threads has a higher performance level than a thread that runs on a computing unit that is simultaneously executing N threads, providing that M<N. This relationship is due to the fact that, in some platforms, the complexity of processing is reduced with a decrease in the number of executing threads. Further, the competition for a shared set of resources goes down with a decrease in the number of executing threads.

Figure 8:
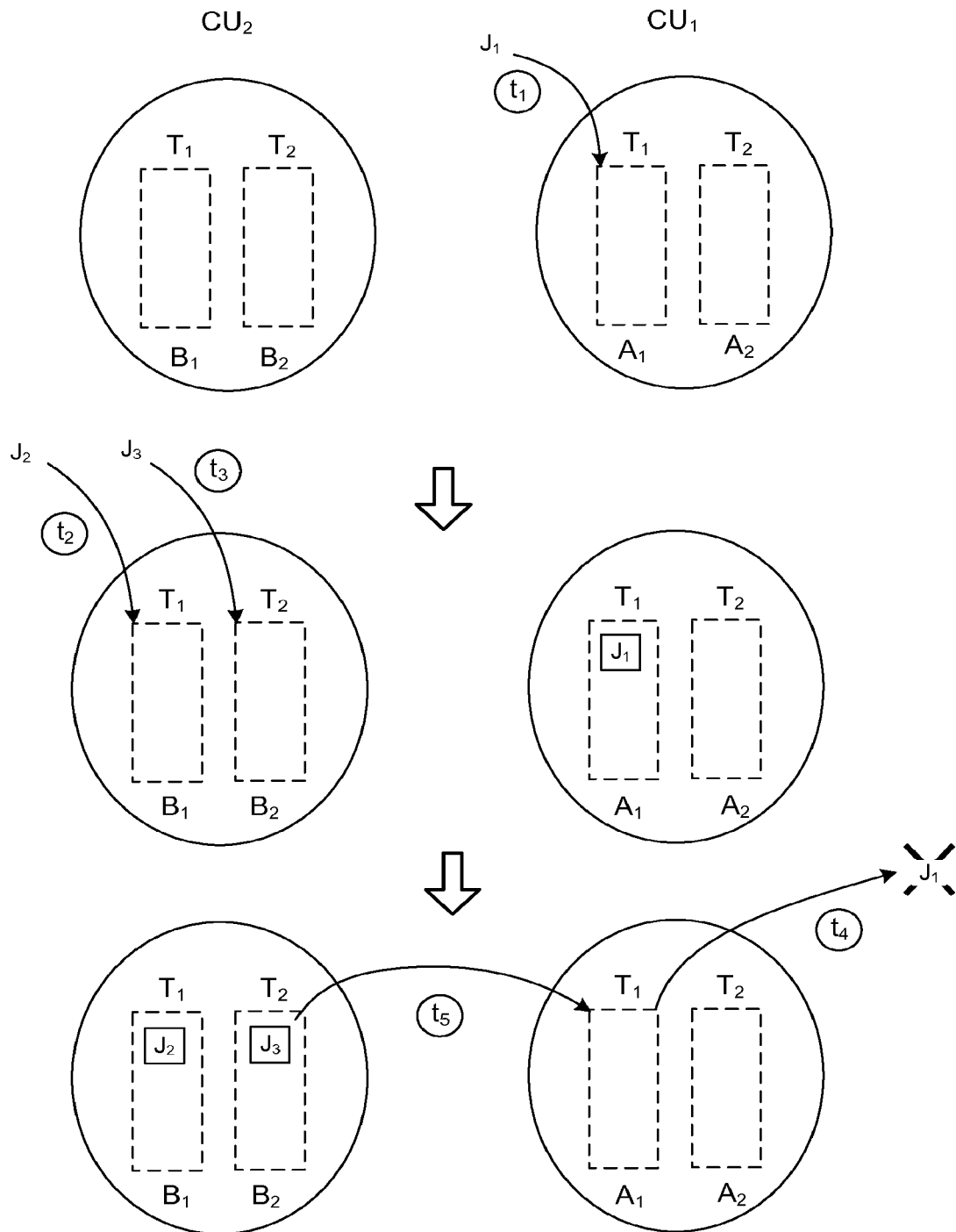
FIG. 8 illustrates a scenario in which the scheduling module assigns jobs to threads implemented by computing units (e.g., processing cores). Here, the threads constitute instantiations of the heterogeneous processing modules of FIG. 1.

FIG. 8 illustrates a scenario in which the scheduling module 118 assigns jobs to hardware threads implemented by two computing units ($CU_1$ and $CU_2$), each of which implements two-way SMT. That is, the first computing unit $CU_1$ has two threads ($A_1$ and $A_2$), while the second computing unit $CU_2$ likewise has two threads ($B_1$ and $B_2$).

At time $t_1$, the scheduling module 118 attempts to assign a new job $J_1$ to the highest-performing processing module (e.g., the highest-performing thread in this case). The scheduling module 118 performs this task by assigning the job $J_1$ to an idle computing unit, if one is available. An idle computing unit is a computing unit that is not running any jobs on its threads. Here, at time $t_1$, the scheduling module 118 assigns the job $J_1$ to thread $A_1$ of computing unit $CU_1$, because that computing unit is idle. If both computing units are idle, the scheduling module 118 can select one of them based on any selection criterion, such as by randomly selecting a computing unit.

At time $t_2$, assume that the scheduling module 118 receives a second job $J_2$. The scheduling module 118 will apply the same rule described above, which results in assigning job $J_2$ to thread $B_1$ of the computing unit $CU_2$. This is because the computing unit $CU_2$ is idle, and thus each of its threads represents a highest-performing processing module.

At time $t_3$, next assume that the scheduling module 118 receives a third job $J_3$. The scheduling module 118 will attempt to apply the same rule described above. But there are no more empty computing units at this time. Therefore, the scheduling module 118 will identify the highest performing thread that is running on a computing unit, where that computing unit is simultaneously executing at least one other thread. If there are two or more computing units that offer a thread that meets this criterion, then the scheduling module 118 will choose the computing unit that is handling the least-urgent in-progress job (e.g., the youngest job). In the particular context of FIG. 8, the scheduling module 118 assigns the job $J_3$ to the thread $B_2$ of the computing unit $CU_2$. Note that both $CU_1$ and $CU_2$ offer threads ($A_2$ and $B_2$, respectively) having the same performance level. But the job $J_1$ that is being run on thread $A_l$ is older than the job $J_2$ that is being run on thread $B_1$. Therefore, job $J_2$ is less urgent that job $J_1$. For this reason, the scheduling module 118 adds the job $J_3$ to the thread $B_2$, not the thread $A_2$.

Next assume that, at time $t_4$, the job $J_1$ terminates on thread $A_l$ for any reason stated above. The scheduling module 118 handles this event by identifying the most urgent job being handled by a lower-performing thread (compared to the thread $A_1$ that is newly-vacated). In the case of FIG. 8, the computing unit $CU_1$ now is running no jobs on its threads, while the computing unit $CU_2$ is running two jobs on its two respective threads. Therefore, both the threads $B_1$ and $B_2$ on $CU_2$ represent lower-performing threads compared to the idle thread $A_1$ of $CU_1$. With respect to $CU_2$, the thread $B_1$ is handling the most-urgent job (e.g., oldest pending job).

At time $t_5$, the scheduling module 118 transfers the job $J_3$ from thread $B_2$ to the idle thread $A_1$ of $CU_1$. As a result, both jobs $J_2$ and $J_3$ now run on computing units that execute a single thread. The transfer of job $J_3$ to $CU_1$ therefore causes both jobs $J_2$ and $J_3$ to run faster. The scheduling module 118 could have achieved the same effect by transferring the most-urgent job $J_2$ to $CU_1$, instead of the job $J_3$. But transferring the job $J_3$ leaves the most-urgent job $J_2$ undisturbed, which may allow it to complete slightly faster (e.g., by not incurring a processing delay associated with the transfer).

Figure 9:
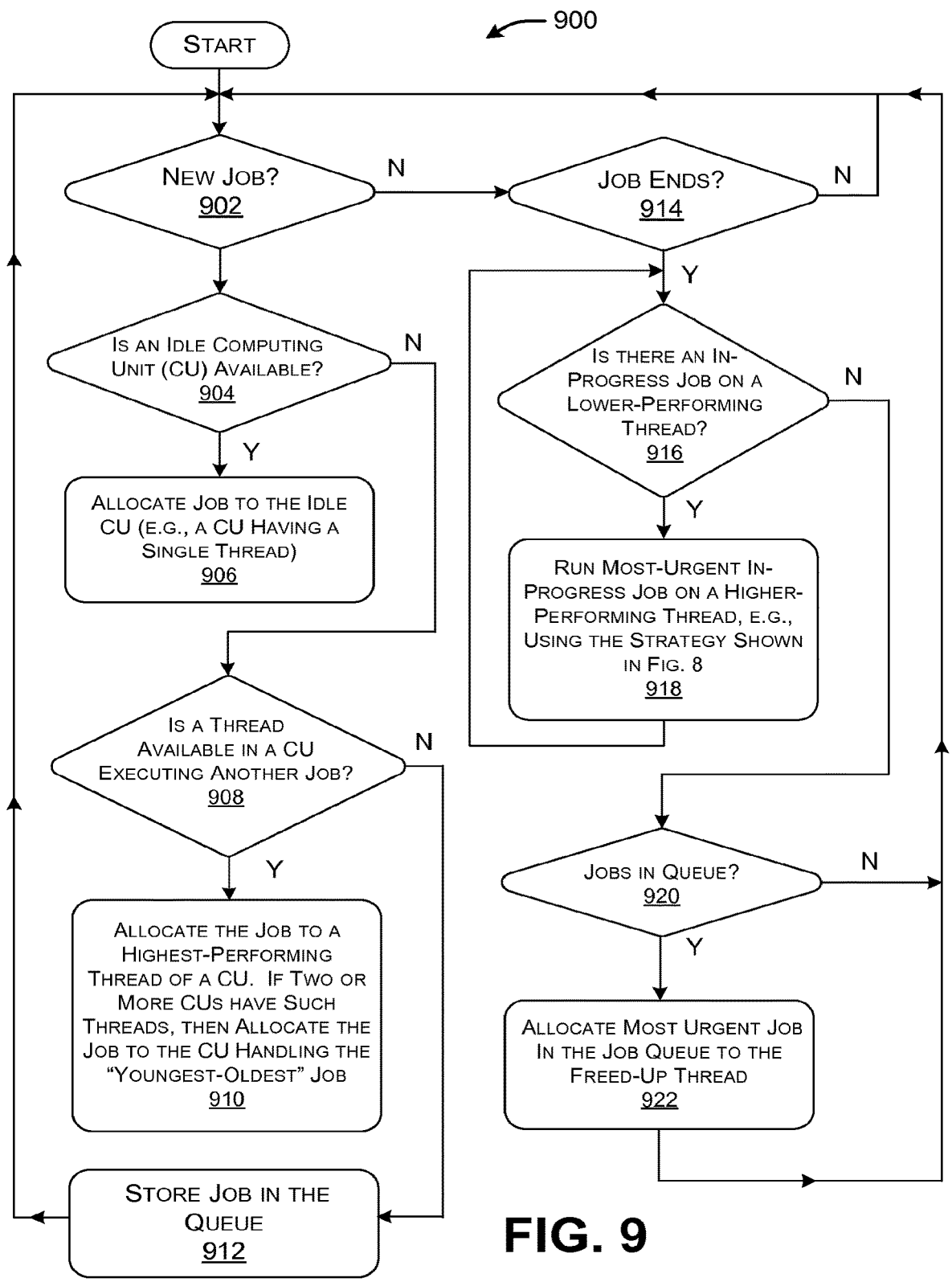
FIG. 9 is a flowchart which explains another manner of operation of the scheduling module of FIG. 1, corresponding to the example of FIG. 8.

FIG. 9 is a procedure 900 which generalizes the operations of FIG. 8 in flowchart form. In block 902, the scheduling module 118 determines whether it has received a new job. If so, in block 904, the scheduling module 118 determines whether there is an idle computing unit (e.g., an idle processing core) available. If this is so, then in block 906, the scheduling module 118 assigns the new job to one of the idle computing units using any selection policy (e.g., by randomly selecting an idle computing unit).

If block 904 is answered in the negative, then, in block 908, the scheduling module determines whether there is a thread available in a computing unit, where that computing unit is currently executing at least one other job in one of its threads. If this is true, then, in block 910, the scheduling module 118 allocates the new job to a highest-performing thread. A computing unit having the highest-performing thread is a computing unit that is executing the least number of threads.

Assume that there are two or more qualifying computing units that host highest performing threads. For example, in two-way SMT, assume that two computing units are each running one other thread. Or in four-way SMT, assume that two computing units are each running two other threads, etc. In this case, the scheduling module 118 can select one of the computing units using the following illustrative and non-limiting logic: (a) first, the scheduling 118 identifies the most-urgent job currently being handled by each of the qualifying computing units, to provide a set of most-urgent jobs; (b) second, the scheduling module 118 identifies a least-urgent job within the set of most-urgent jobs, providing a "least-urgent-among-most-urgent" job, e.g., a "youngest-oldest" job; (c) third, the scheduling module 118 identifies the computing unit associated with the youngest-oldest job, to provide an identified computing unit; and (d) fourth, the scheduling module 118 assigns the new job to an idle thread of the identified computing unit. Block 910 summarizes this procedure by stating that the scheduling module 118 selects the computing unit that is handling the "youngest-oldest" job. In the two-way SMT example of FIG. 8, the scheduling module 118 can be more simply said to assign the new job to the computing unit handling the youngest job. In block 912, the scheduling module 118 stores the new job in the job queue 120 if there are no idle threads available.

In block 914, the scheduling module 118 determines whether a job being executed on a thread has ended for any reason. If so, in block 916, the scheduling module 118 determines whether there is an in-progress job that is being performed on a lower-performing thread (compared to the performance level of the newly-vacated thread). If this is true, then, at block 918, the scheduling module 118 identifies the most-urgent job that is being performed by a lower-performing thread. That most-urgent job will have one or more companion jobs running on the same computing unit. In one approach, the scheduling module 118 identifies the least-urgent of those companion jobs and moves it to the newly-vacated thread. However, in other implementations, the scheduling module 118 can apply other rules to determine which job to transfer to the newly-vacated thread. Any job can be transferred such that the transfer operation results in the desired goal of improving the processing speed at which the most-urgent job is performed.

FIG. 9 indicates that the operations of blocks 916 and 918 can be repeated one or more times until no in-progress job can be moved to a higher-performing thread. This job migration will result in a freed-up thread.

In block 920, after performing the job migration described above, the scheduling module 118 determines whether there are pending jobs in the job queue 120. If so, in block 922, the scheduling module 118 moves the most-urgent job (e.g., oldest job) in the job queue 120 to the freed-up thread.

The scheduling module 118 can also incorporate the logic of FIG. 6 into its processing operations. In this mode, the scheduling module 118 can transfer a new job to a lowest-performing thread. If that job fails to complete within a prescribed amount of time, the scheduling module 118 can transfer the job to a higher-performing thread. The scheduling module 118 can also incorporate the logic of FIG. 7.

The scheduling module 118 can perform the procedure 900 of FIG. 9 subject to zero, one, or more job placement constraints. In a first case, the scheduling module 118 places no constraints on any computing unit that is capable of performing SMT. As such, that computing unit can run any number of jobs in its threads. The processing system 102 operating under this mode can be expected to have the following behavior. At suitably low traffic volume, the processing system 102 will provide mostly high-performing processing modules (e.g., single threads running on computing units). As traffic volume increases, the processing system 102 will increase the mix of processing modules having different performance levels. And at suitably high volumes, the processing system 102 will provide all low-performing processing modules because, presumably, all the threads of the computing units will be constantly occupied in processing a heavy flow of job requests.

In a second case, the scheduling module 118 can define a quota that limits the number the jobs that can be processed by the computing units at any given time. For example, assume that the processing system 102 includes six processing cores that each includes two hardware threads. This processing system can accommodate a total of 12 jobs at any one time. But the scheduling module 118 may set the maximum job quota at, for example, 8 jobs. The advantage of this implementation is that the scheduling module 118 will thereby reserve a certain number of computing units which offer higher-performing threads at any given time (which is not true for the first-stated implementation). This, in turn, will ensure that at least some of the resource-intensive jobs can be migrated up to higher-performing threads if need be. But the scheduling module 118 otherwise places no limitations on which computing unit, at any given time, will offer the higher-performing threads.

In a third case, the scheduling module 118 can designate a maximum number of threads that each computing unit is permitted to use when processing jobs. For example, in the six-core two-way SMT example stated above, the scheduling module 118 can designate four cores as offering two hardware threads, and the remaining two cores as offering one hardware thread (even though these cores can execute two threads). This achieves the same end result as stated above, because the cores can accommodate a maximum of 8 jobs. But, in the third case, the scheduling module 118 can no longer dynamically choose which computing unit operates using two threads. But even in this case, each computing unit that runs two threads can be considered as offering dynamic performance because it can run using one or two threads, offering slower and faster performance levels, respectively.

More generally, all three implementations described above may offer certain advantages over a fixed collection of heterogeneous processing modules. For example, in all cases, the SMT-enabled computing units are reconfigurable to some extent (e.g., by executing different numbers of threads). This enables the scheduling module 118 to dynamically adapt to changes in the nature of job requests that are received over time, and changes in the volume of such requests. This may have certain performance advantages in certain circumstances over a fixed heterogeneous configuration, e.g., as measured in terms of average quality, throughput, and/or energy efficiency; these advantages may be more pronounced when the traffic that is received is highly variable.

Further, the scheduling module 118 can also dynamically alter its configuration settings depending on the nature and volume of job traffic that is received. It can do this by modifying the number of active jobs that are permitted to be processed at any given time, and/or changing the settings which determine how many threads each individual computing unit is allowed to execute. For example, assume that the scheduling module 118 observes that it is receiving a large quantity of quickly-executable job requests. In this case, the scheduling module 118 may wish to increase the job quota, e.g., from a maximum of 8 jobs to a maximum of 10 jobs in the above example. If the flow of computation-intensive jobs increases, however, the scheduling module 118 may wish to throttle back on the number of jobs that are permitted, e.g., from a maximum of 10 jobs to 6 jobs.

C. Representative Computing Functionality

FIG. 10 shows an illustrative environment 1000 in which the type of processing system 102 shown in FIG. 1 can be employed. That is, FIG. 10 shows a data center 1002 having resources that are provided at a single location or distributed over plural locations. The resources include a plurality of processing systems (e.g., 1004, 1006, 1008, . . . ). Each of these processing systems (1004, 1006, 1008) can be implemented using the functionality shown in FIG. 1. For example, each processing system may represent a server having plural processing cores. The processing cores may have different physical characteristics (e.g., different micro-architectures), or may be driven under different conditions, etc. Or the processing cores may use SMT to execute one or more threads. Threads have different performance levels due to the factors described above, and can therefore be regarded as heterogeneous resources.

The data center 1002 can also include interconnection infrastructure 1010 which connects the processing systems (1004, 1006, 1008) together. That interconnection infrastructure 1010 can include a hierarchical network of switches, for example.

Although not shown, the data center 1002 may also include an optional central scheduling module. As explained in Section A, the central scheduling module can replace or supplement the individual scheduling module 118 provided in each processing system.

A user may access the data center 1002 using any type of computer device, such as a personal computer, a smart phone, etc. FIG. 10 represents these computer devices as job submission entities 1012. The entities 1012 may interact with the data center 1002 via any type of communication conduit 1014, such as a wide area network (e.g., the Internet), a local area network, a point-to-point connection, and so on.

In other cases, a user may interact with one or more local processing systems which implement the principles set forth above. For example, a local computer device may perform any application that utilizes a set of heterogeneous processing modules provided by the local computer device. Still other environments can use the kind of heterogeneous processing system 102 described above.

FIG. 11 sets forth illustrative computing functionality 1100 that can be used to implement any aspect of the functions described above. For example, the type of computing functionality 1100 shown in FIG. 11 can be used to implement any aspect of the processing system 102 of FIG. 1. For instance, the computing functionality 1100 may correspond to a server or a local user device, etc. In all cases, the computing functionality 1100 represents one or more physical and tangible processing mechanisms.

The computing functionality 1100 can include volatile and non-volatile memory, such as RAM 1102 and ROM 1104, as well as one or more processing devices 1106 (e.g., one or more CPUs, and/or one or more GPUs, etc.). The processing device 1106 may implement two or more computing units, such as two or more processing cores. Each core, in turn, may implement one or more hardware threads and/or one or more software threads using the SMT technique. The computing functionality 1100 also optionally includes various media devices 1108, such as a hard disk module, an optical disk module, and so forth. The computing functionality 1100 can perform various operations identified above when the processing device(s) 1106 execute instructions that are maintained by any memory (e.g., RAM 1102, ROM 1104, or elsewhere).

More generally, instructions and other information can be stored on any computer readable medium 1110, including, but not limited to, static memory storage devices, magnetic storage devices, optical storage devices, and so on. The term computer readable medium also encompasses plural storage devices. In many cases, the computer readable medium 1110 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1100 also includes an input/output module 1112 for receiving various inputs (via input devices 1114), and for providing various outputs (via output devices 1116). Illustrative input devices include a keyboard device, a mouse input device, a touchscreen input device, a gesture input device, a voice recognition mechanism, and so on. Illustrative output devices include a display device, a printer, a voice output device, and so on. The computing functionality 1100 can also include one or more interfaces 1118 for exchanging data with other entities inside a data center and/or external to the data center, e.g., via one or more communication conduits 1120. One or more communication buses and/or component interconnection networks 1122 communicatively couple the above-described components together.

The communication conduit(s) 1120 can be implemented in any manner, e.g., by a local area network, a wide area network (e.g., the Internet), etc., a direct component interconnection network, an indirect component interconnection network, and so on. The communication conduit(s) 1120 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processing units comprising multiple processing cores having different performance levels, the multiple processing cores including one or more first processing cores having a first performance level and one or more second processing cores having a second performance level that is higher than the first performance level; and
at least one computer-readable storage medium storing instructions which, when executed by the one or more processing units, cause the one or more processing units to:
receive new jobs for execution by the system;
when the one or more second processing cores are available, assign the new jobs to the one or more second processing cores;
when the one or more second processing cores are occupied by other jobs, assign the new jobs to the one or more first processing cores;
measure respective execution times of individual jobs while executing on the one or more first processing cores;
responsive to determining that an individual second processing core has completed a selected job and become available, identify a particular job that has been running the longest on the one or more first processing cores based at least on the measured execution times; and
transfer the particular job from an individual first processing core to the individual second processing core.

2. The system of claim 1, wherein the one or more first processing cores have different hardware than the one or more second processing cores.

3. The system of claim 1, wherein the one or more first processing cores have different processing architectures than the one or more second processing cores.

4. The system of claim 1, wherein the one or more first processing cores run at different speeds than the one or more second processing cores.

5. The system of claim 1, wherein the one or more first processing cores have different power budgets than the one or more second processing cores.

6. A method comprising:
receiving jobs for execution on multiple processing cores with at least three different physical characteristics and at least three different corresponding performance levels, the multiple processing cores including one or more first processing cores having a first performance level, one or more second processing cores having a second performance level that is higher than the first performance level, and one or more third processor cores having a third performance level that is higher than the second performance level;
receiving new jobs for execution by the multiple processing cores;
when the one or more third processing cores are available, assigning the new jobs to the one or more third processing cores;
when the one or more third processing cores are not available and the one or more second processing cores are available, assigning the new jobs to the one or more second processing cores;
when the one or more third processing cores are not available, the one or more second processing cores are not available, and the one or more first processing cores are available, assigning the new jobs to the one or more first processing cores;
measuring respective execution times of individual jobs while executing on the one or more first processing cores and the one or more second processing cores;
responsive to determining that an individual third processing core has completed a selected job and become available, selecting a particular job to move from an individual first processing core or an individual second processing core to the individual third processing core based at least on the particular job having a longest measured execution time of the individual jobs executing on the one or more first processing cores and the one or more second processing cores; and
transferring the particular job from the individual first processing core or the individual second processing core to the individual third processing core.

7. The method of claim 6, further comprising:
in at least one instance when the particular job with the longest measured execution time is executing on the individual second processing core when the individual third processing core becomes available, transferring the particular job from the individual second processing core to the individual third processing core.

8. The method of claim 7, further comprising:
in at least one other instance when the particular job with the longest measured execution time is executing on the individual first processing core when the individual third processing core becomes available, transferring the particular job from the individual first processing core to the individual third processing core without executing the particular job on any of the one or more second processing cores.

9. The method of claim 8, wherein the at least three different physical characteristics comprise at least three different computing architectures.

10. The method of claim 8, wherein the at least three different physical characteristics comprise at least three different core speeds.

11. The method of claim 8, wherein the at least three different physical characteristics comprise at least three different power budgets.

12. The method of claim 8, wherein the at least three different physical characteristics comprise at least three different hardware components.

13. The method of claim 8, performed entirely on a single computing device comprising the multiple processing cores.

* * * * *